United States Patent [19]

Gerstenberger et al.

[11] Patent Number: 5,235,909

[45] Date of Patent: Aug. 17, 1993

[54] DEVICE FOR DAMPING BENDING VIBRATIONS IN A CYLINDER OF A ROTARY PRINTING PRESS

[75] Inventors: Markus Gerstenberger; Gerd Raasch, both of Sandhausen, Fed. Rep. of Germany

[73] Assignee: Heidelberger Druckmaschinen AG, Heidelberg, Fed. Rep. of Germany

[21] Appl. No.: 779,366

[22] Filed: Oct. 17, 1991

[30] Foreign Application Priority Data

Oct. 19, 1990 [DE] Fed. Rep. of Germany ....... 4033278

[51] Int. Cl.⁵ .............................................. B41F 5/00
[52] U.S. Cl. .................................................. 101/216
[58] Field of Search ............... 101/216, 219, 212, 217, 101/162 B; 74/574, 573 F, 604; 118/258

[56] References Cited

U.S. PATENT DOCUMENTS

| | | | |
|---|---|---|---|
| 4,125,073 | 11/1978 | Bain | 101/216 |
| 4,487,123 | 12/1984 | Köbler et al. | 101/216 |
| 4,487,124 | 12/1984 | Kobler et al. | 101/216 |
| 4,739,702 | 4/1988 | Kobler | 101/216 |
| 4,873,888 | 10/1989 | Matsuyama | 74/574 |

FOREIGN PATENT DOCUMENTS

| | | |
|---|---|---|
| 3338571 | 7/1984 | Fed. Rep. of Germany . |
| 3230120 | 8/1984 | Fed. Rep. of Germany . |
| 3527711 | 9/1986 | Fed. Rep. of Germany . |
| 2073368 | 10/1981 | United Kingdom ............... 101/364 |

*Primary Examiner*—J. Reed Fisher
*Attorney, Agent, or Firm*—Herbert L. Lerner; Laurence A. Greenberg

[57] ABSTRACT

A device for damping bending vibrations in a printing-unit cylinder of a rotary printing press includes at least one damper disposed in a printing-unit cylinder and tunable to a wide-band frequency, the damper having at least one member with a natural frequency corresponding to a natural frequency of the printing-unit cylinder, and a device for supporting the damper member so that the damper member is deflected in phase opposition to a deflection of the printing-unit cylinder.

4 Claims, 4 Drawing Sheets

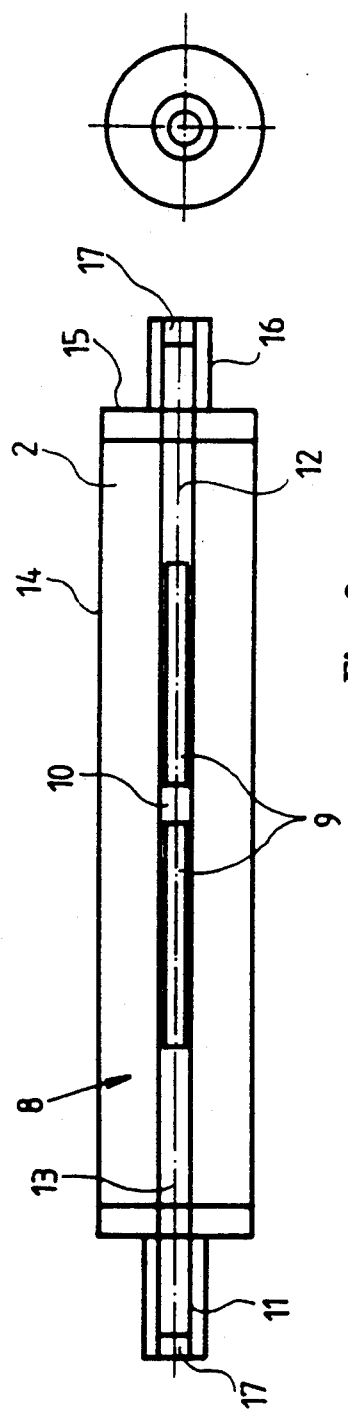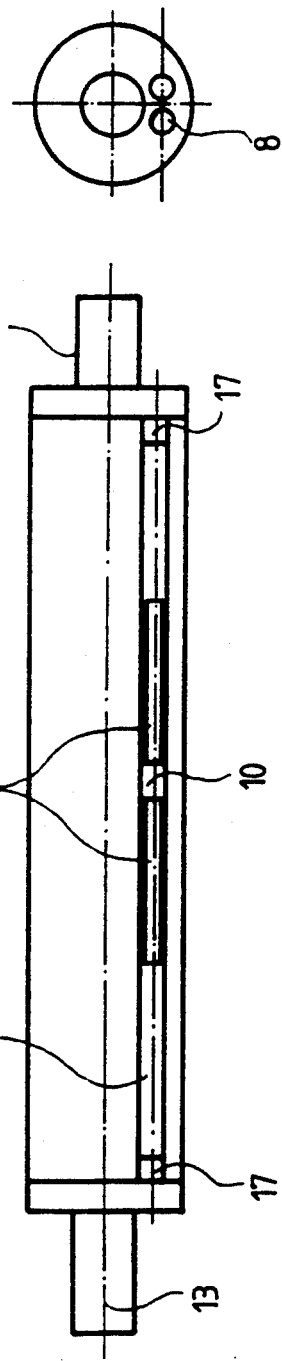

DEVICE FOR DAMPING BENDING VIBRATIONS IN A CYLINDER OF A ROTARY PRINTING PRESS

The invention relates to a device for damping bending vibrations in a cylinder of a rotary printing press.

Heretofore known from the prior art as exemplified by German Patent 35 27 711 are printing-unit cylinders having a device for reducing the torsional and bending vibrations which are excited in the cylinders when the mutually engaging cylinders rotate or roll past or over the channel formed in at least one of the cylinders.

Vibrations are fed via cross pieces to a damping system. The damping system encompasses damping elements formed of torsion springs and spiral springs, which are attached to arms on the cross piece. The damping elements are provided for absorbing the applied vibrations. Furthermore, legs of the damping elements terminate just beneath the jacket or casing of the cylinder. Due to the provision of function locations or joints formed in this manner between cylinder jacket and leg of the damping element, the elastic shock occurring when a rollover of the cylinder channel takes place is supposed to be passed on to the damping system and absorbed.

Because combined torsional- and bending-vibration dampers are involved, which, in addition, are also supposed to absorb and reduce radial and torsional shocks, respectively, they are suitable only to a limited extent for damping a specific mode of vibration, such as the bending vibration of a printing-unit cylinder, for example. A combined torsional- and bending-vibration damper can only represent a compromise and can only insufficiently reduce, for example, bending vibrations which have been excited in a cylinder. Moreover, the combined torsional- and bending-vibration damping system entails a very complex geometry which excites the system into complex, non-defined modes of natural vibrations. These, however, are highly undesirable.

Departing from the state of the prior art, it is an object of the invention with regard to the bending vibrations induced by the rolling-over of the cylinder channel, to reduce both their modes of natural vibration and also the higher harmonics thereof and to exclude any possible ink-density fluctuations in the printed product.

With the foregoing and other objects in view, there is provided, in accordance with the invention, a device for damping bending vibrations in a printing-unit cylinder of a rotary printing press, comprising at least one damper disposed in a printing-unit cylinder and tunable to a wide-band frequency, the damper having at least one member with a natural frequency corresponding to a natural frequency of the printing-unit cylinder, and means for supporting the damper member so that the damper member is deflected in phase opposition to a deflection of the printing-unit cylinder.

An advantage of this construction is that the wide-band tunable dampers exert upon the printing-unit cylinder a restoring force which counteracts the cylinder vibration and variations in contact pressure between printing-unit cylinders. This restoring force causes a reduction in the vibration amplitudes by an amount which is a considerable part of their original amplitude.

In accordance with another feature of the invention, the damper member is a bending rod, and the supporting means is a supporting structure rigid with the printing-unit cylinder, the bending rod being received in a bore formed in the printing-unit cylinder.

In accordance with a more specific feature of the invention, the bore is coaxial with the printing-unit cylinder. This construction permits an effective reduction in the vibration amplitudes in the middle of the printing-unit cylinder at the point at which there is the greatest deflection.

In accordance with a further feature of the invention, the bending rod occupies only part of the bore, and a medium having damping properties is received in another part of the bore.

In accordance with more specific details of the invention, the damping medium is mineral oil or silicone oil.

Thus, the bores also constitute cavities provided in the damper which are filled with liquids having high viscosity. The use of such liquids affords the wide band tuning of the damping characteristic of the dampers. By filling the cavities with liquids of different viscosity or, possibly, fluidized solids, a fine-tuning of the damper characteristic may be attained, while being able to take into account also the properties of the coverings which may be clamped onto the printing-unit cylinders.

In accordance with an added feature of the invention, the damper is disposed in the printing-unit cylinder coaxially with the rotational axis of the printing-unit cylinder. This avoids the necessity for installing balancing masses, and the press runs more smoothly.

In accordance with an additional feature of the invention, the printing-unit cylinder is formed with a channel, and the damper is disposed in the printing-unit cylinder in vicinity of a location diametrically opposite the channel. Thus, one or more dampers may be disposed parallel to the rotational axis of the printing-unit cylinder. The distribution of the dampers in the printing-unit cylinder permits a selective introduction or application of the restoring forces which counteract the bending vibration of the cylinder.

In accordance with yet another feature of the invention, there is provided a plurality of the dampers disposed in the printing-unit cylinder in vicinity of the location diametrically opposite the channel.

In accordance with yet a further feature of the invention, the printing-unit cylinder has a hollow interior, the damping member is a damping mass received in the hollow interior of the printing-unit cylinder, and the support means comprise a flexible strut rigidly secured in the hollow interior to the printing-unit cylinder.

In accordance with yet an added feature of the invention, the printing-unit cylinder has a hollow interior, and the damping mass is mounted on at least one spring element secured in the hollow interior of the printing-unit cylinder.

In accordance with a concomitant feature of the invention, the printing-unit cylinder has a hollow interior, the damping mass is a solid bending rod, and the supporting means are a wall-like member secured to the printing-unit cylinder within the hollow interior thereof.

Other features which are considered as characteristic for the invention are set forth in the appended claims.

Although the invention is illustrated and described herein as embodied in a device for damping bending vibrations in a cylinder of a rotary printing press, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which:

FIGS. 2a and 2b are respective longitudinal and end views of a printing-unit cylinder showing the arrangement and construction of one embodiment of the dampers according to the invention;

FIGS. 2c and 2d are respective longitudinal and end views of a printing unit cylinder showing the arrangement and construction of another embodiment of the dampers;

Figure 1:
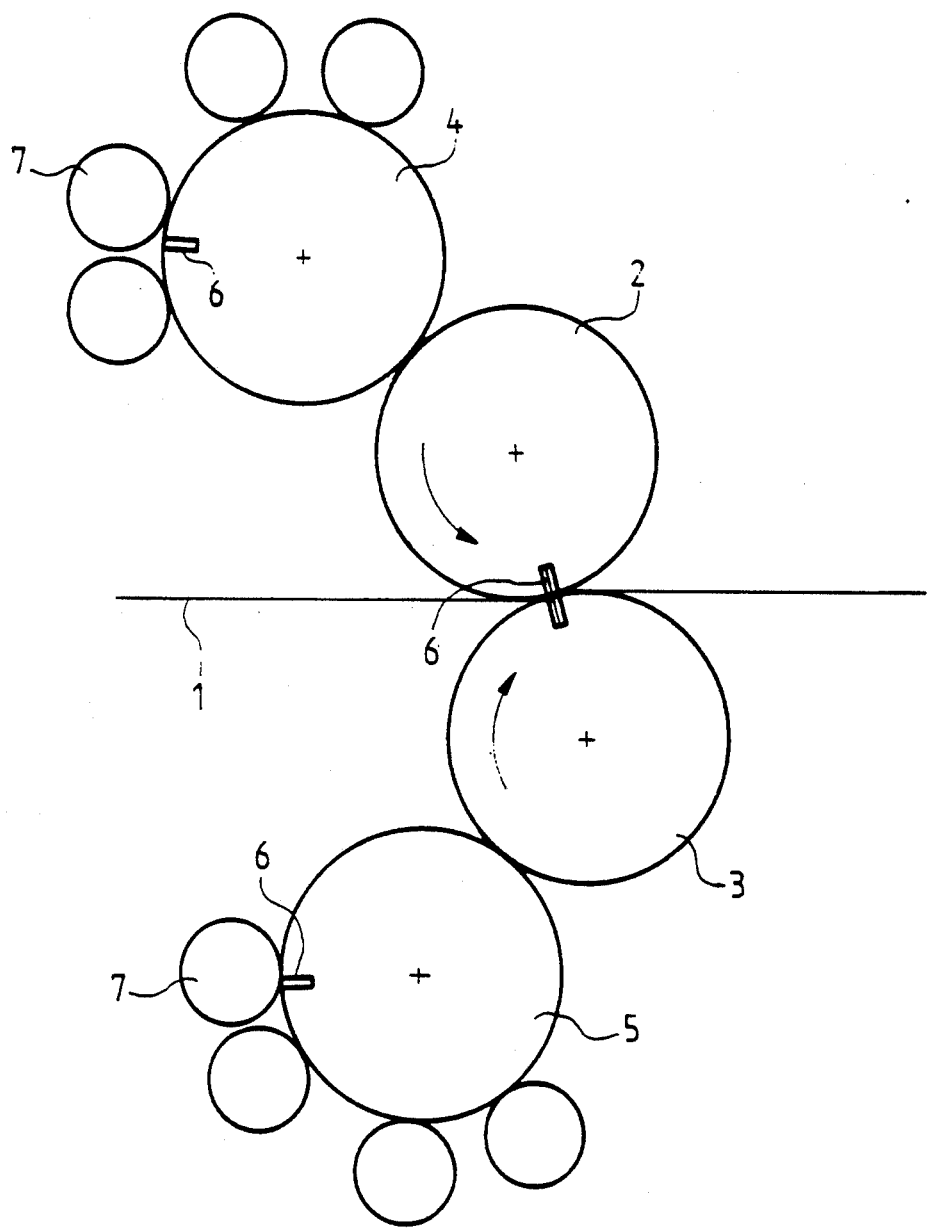
FIG. 1 is a diagrammatic side elevational view of a printing-unit configuration of a web-fed rotary printing press.

Referring now to the drawing and, first, particularly to FIG. 1 thereof, there is shown therein a printing-unit configuration of a web-fed rotary printing press. A paper web 1, as it passes through the printing unit, is printed on both sides by the rubber-blanket cylinders 2 and 3. Just like the rubber-blanket cylinders 2 and 3, the plate cylinders 4 and 5 are formed with axially parallel channels 6, which accommodate non-illustrated clamping devices for fixing cylinder coverings to the cylinder jackets or casings. Form rollers 7 are in engagement with the plate cylinders 4 and 5, and ink the non-illustrated printing form carried by the latter cylinders. In the interest of clarity, cylinder bearers or Schmitz rings, on which plate cylinders and rubber-blanket cylinders run, are not illustrated.

FIGS. 2a and 2b show dampers 8 according to the invention, in the installed condition thereof. Slim bending rods 9 are attached in the middle of a printing-unit cylinder to a support 10. To facilitate installation, the slim bending rods 9 may be slightly conical in shape. Cavities 12, remaining in a bore 11 after the attachment of the slim bending rods 9 to the support 10 by any suitable means, are filled with a fluid having a viscosity suitably selected for obtaining the desired damping characteristic or fine-tuning of the natural bending frequency of the cylinder, and contributing to the wide-band tuning of the damping system. The fluid may be viscous mineral oil or silicone oil capable of absorbing high shear forces.

The manner of operation of the device according to the invention is described hereinafter. When the channels 6 formed in the rubber-blanket cylinders 2 and 3 are rolled over, bending vibrations are excited in these printing-unit cylinders. Because the non-illustrated cylinder bearings and cylinder bearers or Schmitz rings exert a stiffening effect, the greatest deflections or bending of the printing-unit cylinders 2 and 3 occur in the middle thereof.

Because the support 10, to which the slim bending rods 9 are secured, is disposed in the middle of the printing-unit cylinders 2 and 3, the support 10 follows the deflection of the cylinder when it is excited. The motion of the respective printing-unit cylinder 2, 3 is transmitted to the respective support 10. Consequently, the support 10 executes the same deflection experienced by the printing-unit cylinder 2, 3. The inertial mass of the slim bending rods 9 causes the end sections of the slim bending rods 9 to be deflected only when the respective printing-unit cylinder oscillates in the opposite direction, with respect to the first deflection thereof. At that instant, the deflection of the printing-unit cylinders 2, 4 and those of the end sections of the slim bending rods 9 are opposed to one another. This opposed-phase deflection subsequent to the excitation of the vibrations produce the restoring force which, as the printing-unit cylinders 2, 3 rotate during the operation of the printing press, opposes the deflection of the cylinders.

As can be seen also from FIG. 2a, in a rubber-blanket cylinder 2, 3, the bore 11 may lie concentrically to or coaxial with the rotational axis 13 of the respective printing-unit cylinder 2, 3. In a plate cylinder 4, 5, as shown in FIGS. 2c and 2d, the bores 11 may also be disposed substantially diametrically opposite the channel 6. As shown in FIG. 2d, two bores 11 may be provided adjacent one another. As shown in FIGS. 2a and 2c, the cavities 12 are provided with suitable end closures or stoppers 17.

Figure 3:
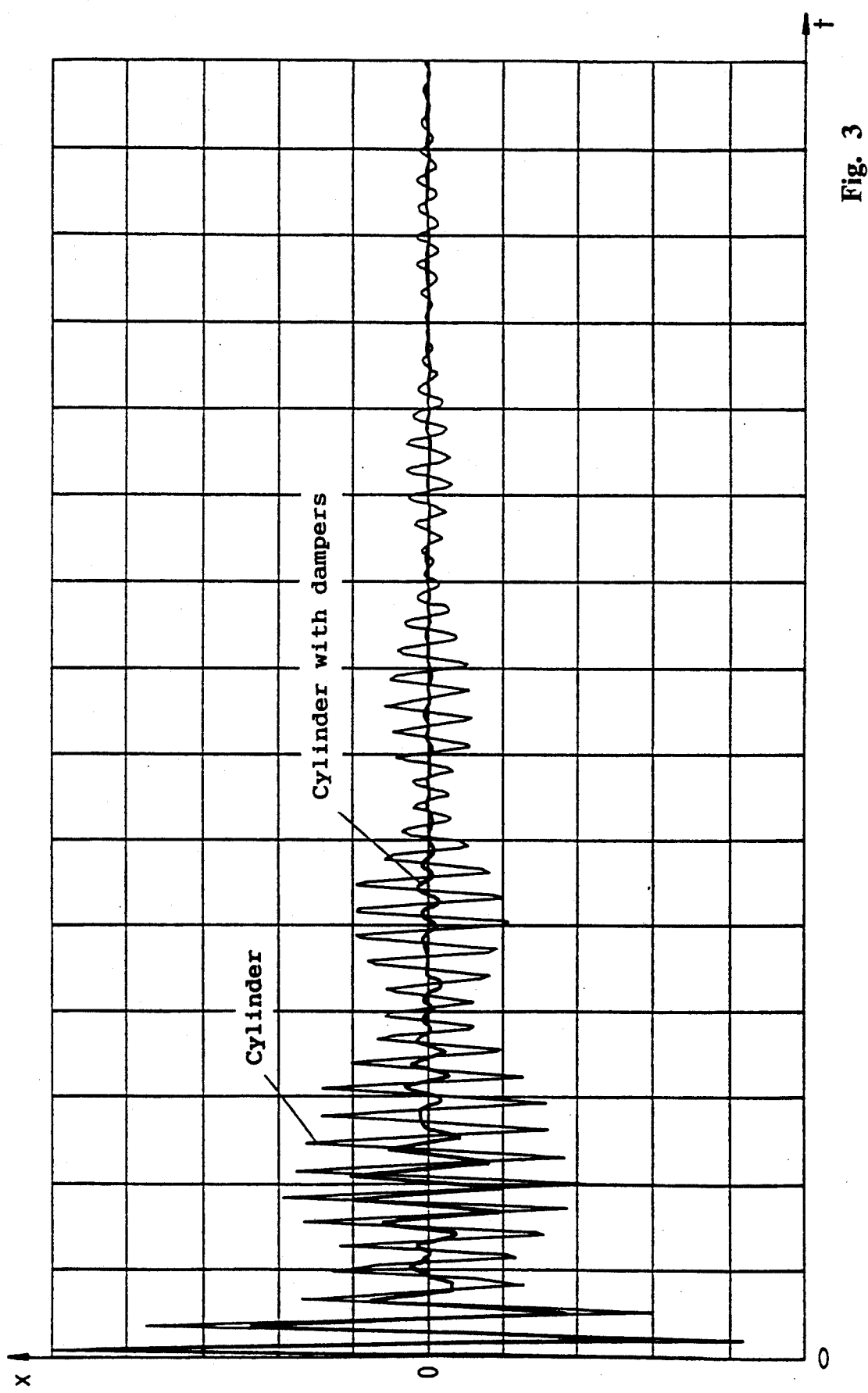
FIG. 3 is a plot diagram of the time rate of change of vibration curves for a printing-unit cylinder with and without damping.

FIG. 3 is a plot diagram of vibrations in a printing-unit cylinder with damping in accordance with the invention and without damping. As can be seen from the figure, cylinders with dampers according to the invention exhibit very greatly reduced vibration amplitudes in comparison with those of standard cylinders without dampers or, for that matter, with conventional dampers. Moreover, the vibrations decay very much faster in the cylinder with a damper according to the invention. This is ascribed to the opposed-phase deflection, which quickly reduces and effectively suppresses the vibration amplitudes.

Figure 5:
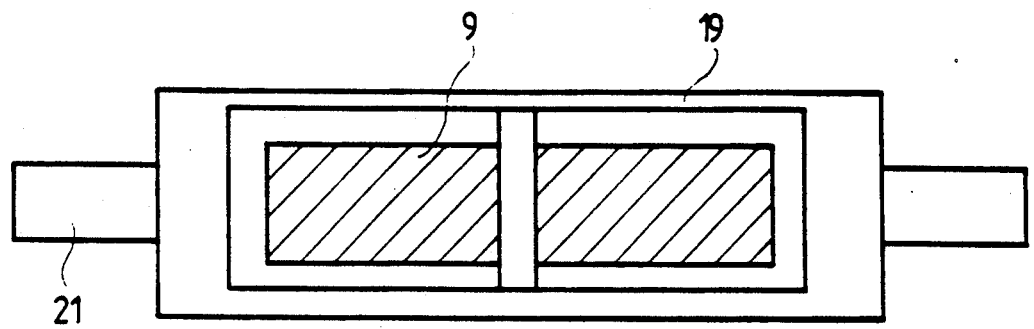
FIGS. 4 and 5 are diagrammatic longitudinal sectional views of a printing unit with other embodiments of the damper.
Figure 4:
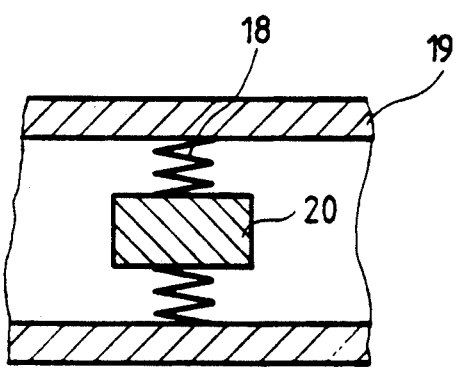

FIGS. 4 and 5 show different additional embodiments of the masses which may be used in the dampener according to the invention especially in hollow cylinders. Thus, in FIG. 4, for example, a damping mass 20, mounted on spring elements 18 in a hollow cylinder 19, may be provided in the center of the hollow cylinder 19. FIG. 5 shows an example of an installation in which, where sufficient space is available, heavy, massive bending rods 9 can be used in the hollow cylinder 19 with journals 21 screwed thereon.

We claim:

1. Device for damping bending vibrations in a printing-unit cylinder of a rotary printing press, comprising at least one damper disposed in a printing-unit cylinder and tunable to a wide-band frequency, said damper having a pair of members with a natural frequency corresponding to a natural frequency of the printing-unit cylinder, and means for supporting said pair of damper members so that said damper members are deflected in phase opposition to a deflection of the printing-unit cylinder, each of said damper members being a bending rod, and said supporting means being a supporting structure rigid with the printing-unit cylinder, said bending rod being received with clearance in a bore formed in the printing-unit cylinder and being attached at one end thereof to said supporting structure and being free at the other end thereof, said bore bring coaxial with the printing-unit cylinder and constituting an elongated chamber occupied at one end thereof by said bending rod, and having a remaining space filled with a liquid medium having damping properties.

2. Device according to claim 1, wherein said damping medium is mineral oil.

3. Device according to claim 1, wherein said damping medium is silicone oil.

4. Device according to claim 1, wherein said damper is disposed in the printing-unit cylinder coaxially with the rotational axis of the printing-unit cylinder.

* * * * *